United States Patent
Charvet et al.

(10) Patent No.: US 12,544,113 B2
(45) Date of Patent: Feb. 10, 2026

(54) FRICTION-FIT IMPLANTABLE DEVICES AND ASSEMBLIES

(71) Applicant: ORTHOFIX US LLC, Lewisville, TX (US)

(72) Inventors: Jose Luis Charvet, Lewisville, TX (US); Frank LaRosa, Lewisville, TX (US); John Lovell, Lewisville, TX (US)

(73) Assignee: Orthofix US LLC, Lewisville, TX (US)

( * ) Notice: Subject to any disclaimer, the term of this patent is extended or adjusted under 35 U.S.C. 154(b) by 0 days.

(21) Appl. No.: 18/701,015

(22) PCT Filed: Nov. 9, 2022

(86) PCT No.: PCT/US2022/049397
§ 371 (c)(1),
(2) Date: Apr. 12, 2024

(87) PCT Pub. No.: WO2023/086380
PCT Pub. Date: May 19, 2023

(65) Prior Publication Data
US 2024/0398446 A1  Dec. 5, 2024

Related U.S. Application Data

(60) Provisional application No. 63/278,340, filed on Nov. 11, 2021.

(51) Int. Cl.
*A61B 17/70* (2006.01)

(52) U.S. Cl.
CPC ................. *A61B 17/7037* (2013.01)

(58) Field of Classification Search
CPC ............ A61B 17/7035; A61B 17/7037; A61B 17/7038; A61B 17/7032; A61B 17/7034
See application file for complete search history.

(56) References Cited

U.S. PATENT DOCUMENTS 7,947,065 B2 * 5/2011 Hammill, Sr. ..... A61B 17/7037
606/267
8,075,603 B2 12/2011 Hammill, Sr.
(Continued)

FOREIGN PATENT DOCUMENTS

| DE | 102018102173 B3 * | 6/2019 | ......... A61B 17/7076 |
| EP | 2886073 A1 * | 5/2015 | ......... A61B 17/7037 |
| WO | WO-2018024414 A1 * | 2/2018 | ......... A61B 17/7037 |

OTHER PUBLICATIONS

International Searching Authority, International Search Report and the Written Opinion of the International Searching Authority, International Application No. PCT/US22/49397, mailed Feb. 27, 2023, 9 pages, ISA/US.

*Primary Examiner* — Jacqueline T Johanas
(74) *Attorney, Agent, or Firm* — Haynes and Boone, LLP

(57) ABSTRACT

An implantable device may be configured to couple to a bone screw for spinal fixation. The implantable device may include one or more friction-fit features to allow the implantable device to maintain its orientation before being locked into place by a set screw. For example, an implantable device may include a body comprising a sidewall. The sidewall may define a first passage extending within the sidewall and parallel to a vertical axis of the body, and a slot extending through the sidewall and in communication with the first passage. The device may further include a pressure member coupled to the body. The pressure member may include a distal surface for engaging the head of the bone screw. The device may further include a biasing member at least partially within the first passage of the body for applying a downward force on the pressure member.

20 Claims, 12 Drawing Sheets

(56) References Cited

U.S. PATENT DOCUMENTS

| | | | |
|---|---|---|---|
| 8,197,518 B2 | 6/2012 | Hammill, Sr. | |
| 8,998,959 B2 | 4/2015 | Jackson | |
| 9,480,517 B2 | 11/2016 | Jackson | |
| 9,498,255 B2* | 11/2016 | Lovell | A61B 17/7037 |
| 9,504,495 B2* | 11/2016 | Termyna | A61B 17/7037 |
| 9,526,529 B2* | 12/2016 | Charvet | A61B 17/7037 |
| 9,603,632 B1 | 3/2017 | Gunn | |
| 9,763,700 B1 | 9/2017 | Gregory | |
| 10,258,385 B1* | 4/2019 | Doubler | A61B 17/7037 |
| 10,485,594 B2 | 11/2019 | Toon | |
| 10,595,906 B2 | 3/2020 | Purcell | |
| 11,154,331 B2 | 10/2021 | Toon | |
| 11,333,192 B1* | 5/2022 | Lentner | F16C 11/069 |
| 11,413,072 B2* | 8/2022 | Heuer | A61B 17/7037 |
| 11,596,449 B2* | 3/2023 | Jackson | A61B 17/7035 |
| 2008/0200956 A1* | 8/2008 | Beckwith | A61B 17/7032 606/301 |
| 2010/0137920 A1 | 6/2010 | Hammill, Sr. | |
| 2012/0016425 A1* | 1/2012 | Shaffrey | A61B 17/7002 606/305 |
| 2012/0209335 A1* | 8/2012 | Termyna | A61B 17/7037 606/300 |
| 2013/0338721 A1* | 12/2013 | Biedermann | A61B 17/7034 606/305 |
| 2014/0025119 A1* | 1/2014 | Biedermann | A61B 17/7032 606/266 |
| 2014/0172023 A1 | 6/2014 | Garamszegi | |
| 2014/0228890 A1* | 8/2014 | Raju | A61B 17/8883 606/267 |
| 2015/0088202 A1 | 3/2015 | Charvet | |
| 2015/0134006 A1* | 5/2015 | Ziolo | A61B 17/7035 606/278 |
| 2015/0142059 A1* | 5/2015 | Biedermann | A61B 17/7037 606/266 |
| 2015/0182261 A1* | 7/2015 | Lovell | A61B 17/7037 470/6 |
| 2016/0262816 A1* | 9/2016 | Doubler | A61B 17/8605 |
| 2017/0020576 A1* | 1/2017 | Siccardi | A61B 17/7034 |
| 2017/0172630 A1* | 6/2017 | Biedermann | A61B 17/7035 |
| 2019/0175224 A1* | 6/2019 | Doubler | A61B 17/7037 |
| 2020/0054366 A1 | 2/2020 | Ark | |
| 2020/0352609 A1* | 11/2020 | Heuer | A61B 17/7037 |
| 2021/0030445 A1 | 2/2021 | Avidano | |
| 2021/0059723 A1* | 3/2021 | Biedermann | A61B 17/7035 |
| 2024/0122628 A1* | 4/2024 | Heuer | A61B 17/7037 |
| 2024/0238013 A1* | 7/2024 | Heuer | A61B 17/7037 |

\* cited by examiner

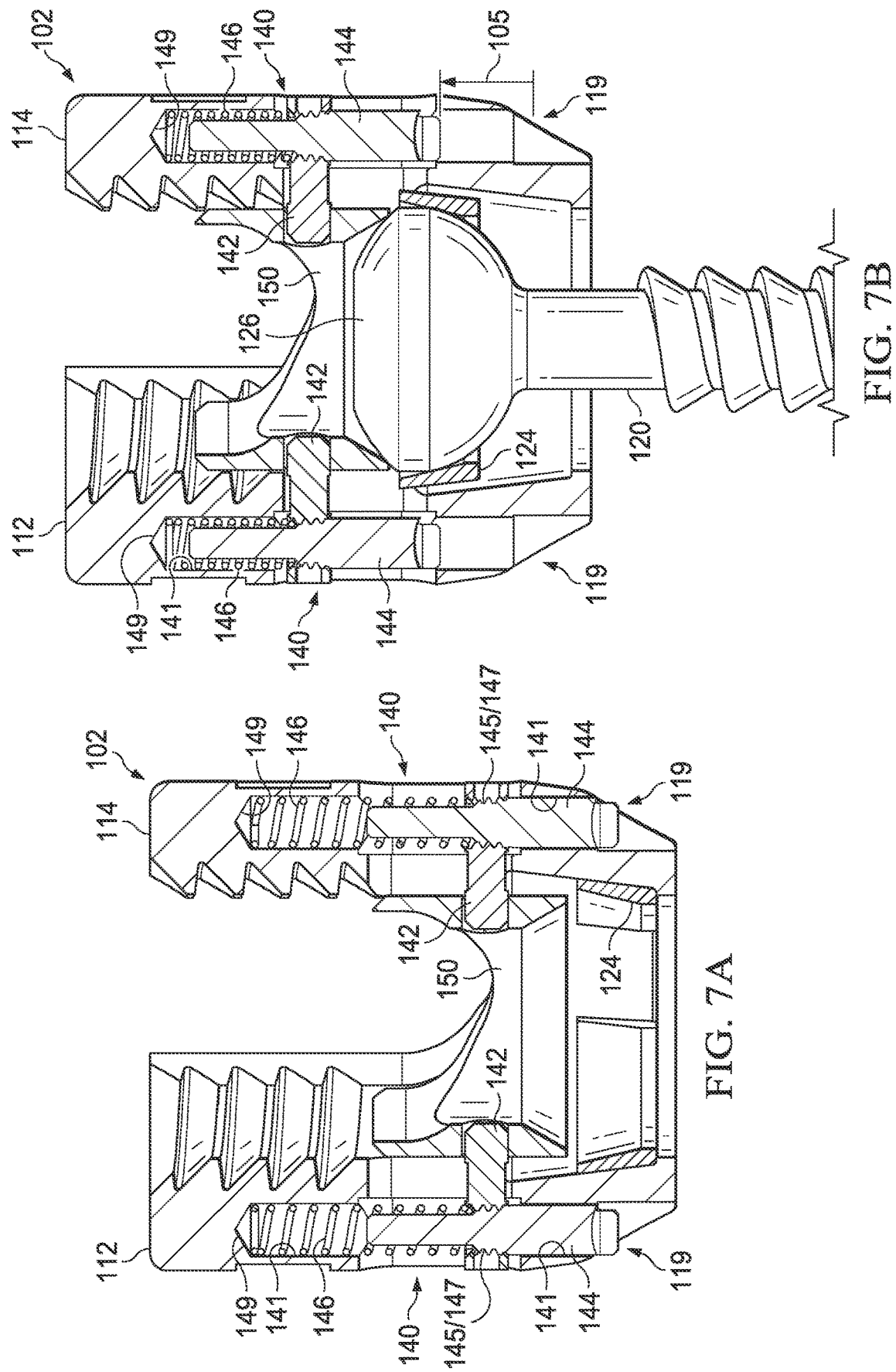

FRICTION-FIT IMPLANTABLE DEVICES AND ASSEMBLIES

CROSS-REFERENCE TO RELATED APPLICATIONS

This application is a U.S. National Stage patent application of International Application No. PCT/US2022/049397, filed Nov. 9, 2022, which claims the benefit of U.S. Provisional Application No. 63/278,340, filed Nov. 11, 2021, the benefit of which is claimed and the disclosures of which are incorporated herein by reference in their entirety.

TECHNICAL FIELD

This disclosure is generally directed to friction-fit implantable devices and assemblies attachable to fixation rods for aligning an anatomy of a patient. For instance, one or more implantable assemblies including a receiver body coupled to a bone screw may be coupled to a connecting rod to retain one or more vertebrae in a desired relationship.

BACKGROUND

Various systems for connecting fasteners (e.g., pedicle screws) to elongated supports (e.g., fixation rods) for the purposes of vertebral fixation have been proposed. Although described with reference to vertebral or spinal fixation, it should be appreciated that the systems described herein may be similarly applicable to other bone structures as well.

Generally, fixation systems include a receiver (or "receiver body," "body," or "head") which is attachable to both a fastener and a fixation rod to retain the rod in fixed relation to the fastener, and in turn, a vertebra into which the fastener is secured. Traditional receiver assemblies include a receiver and a fastener for attachment of fixation rod to a vertebra. A physician may use multiple receiver assemblies and/or multiple rods to secure the vertebrae in a desired spatial relationship. In some installations, a first rod may extend along a first side of a patient's spine and engage a first plurality of fastener assemblies each implanted in a different vertebra, and a second rod may extend along a second side of the patient's spine and engage a second plurality of fastener assemblies.

In some instances, a receiver assembly may come preassembled such that the receiver and fastener are preselected and attached to one another by the manufacturer. The assembly of the fastener and the receiver may involve special tools and trained technicians such that assembly by the physician, nurse, or surgical technician is impractical. Accordingly, the surgeon or technician may select a receiver and fastener assembly from a plurality of receiver and fastener assemblies based on the patient's anatomy and/or indications. Accordingly, the surgeon may be limited based on the variety of selections available at the time of surgery.

During a spinal fixation surgery, the receiver and fastener assemblies may be inserted through the patient's tissue via a surgical opening or ingress. The fasteners of each assembly may be driven into the patient's vertebra at desired locations. A connecting rod is then positioned through each receiver and the receivers and connecting rod are fixed in place by set screws or compression screws in each receiver. In order to position the connecting rod through each receiver, the receivers are oriented in alignment so that the connecting rod can be inserted through a channel or slot of each receiver. The alignment of the receivers can be a complicated part of the procedure. For example, gravity may cause the receivers to droop or slip out of alignment. Accordingly, the procedure may involve repositioning and/or reorienting one or more receivers multiple times before the connecting rod is successfully positioned through each receiver.

SUMMARY

The present disclosure describes implantable devices and assemblies that provide a friction fit between a receiver body and a fastener (e.g., bone screw). For example, an implantable device may be configured to apply a frictional force to a screw head so that an orientation of the receiver body can be maintained relative to the screw head before the position is fixed by a set screw. Further, the implantable devices of the present disclosure may allow for modular assembly before or during a spinal fixation procedure. For example, the implantable device may allow for bottom-side loading of the screw into the receiver body so that various screws having various characteristics (e.g., length, diameter, etc.) can be coupled to the receiver body.

According to one aspect of the present disclosure, an implantable device is configured to couple to a head of a bone screw. The implantable device includes: a body comprising a sidewall defining: a first passage extending within the sidewall and parallel to a vertical axis of the body; and a slot extending through the sidewall and in communication with the first passage; a pressure member coupled to the body such that the sidewall at least partially surrounds the pressure member, the pressure member comprising a distal surface configured to engage the head of the bone screw; a first biasing member positioned at least partially within the first passage of the body and configured to apply a downward force on the pressure member relative to the body.

In some aspects, the pressure member comprises a lateral surface defining an engagement feature, and wherein the first biasing member comprises: a first pin positioned through the slot of the body and in the engagement feature of the pressure member; and a spring positioned within the first passage of the body and configured to apply, via the first pin, a downward force on the pressure member relative to the body. In some aspects, the engagement feature comprises an opening in the lateral surface of the pressure member. In some aspects, the first pin defines a pin opening extending through the first pin in a direction transverse to a longitudinal axis of the first pin, the first biasing member further includes a second pin coupled to the first pin and extending through the pin opening, and at least a portion of the spring is positioned around a proximal portion of the second pin. In some aspects, the first passage comprises first screw threads at a distal opening of the first passage, and the second pin comprises second screw threads at a distal portion of the second pin configured to engage the first screw threads.

In some aspects, the first pin comprises third screw threads at the pin opening, and wherein the second pin comprises fourth screw threads configured to engage the third screw threads. In some aspects, the first pin comprises: a first portion positioned in the engagement feature; and a second portion positioned within the slot. In some aspects, the sidewall of the body further defines a second passage extending within the sidewall and parallel to the vertical axis of the body, and the implantable device further comprises a second biasing member positioned at least partially within the second passage of the body and configured to apply a downward force on the pressure member relative to the body.

In some aspects, the body comprises a first vertical tab extending proximally from a base of the body and a second vertical tab extending proximally from the base of the body, the first passage is defined within the first vertical tab and offset from a center of the first vertical tab, and the second passage is defined within the second vertical tab and offset from a center of the second vertical tab. In some aspects, the pressure member further comprises a proximal surface defining a saddle configured to receive a connecting rod. In some aspects, the spring comprises a coil spring. In some aspects, the device further includes a set screw configured to apply a downward pressure on the pressure member and the head of the bone screw.

According to another aspect of the present disclosure, an implant includes: a body comprising a first arm and a second arm extending vertically from a base of the body, wherein: the first arm defines a first vertical tunnel within a sidewall of the first arm, the first vertical tunnel being offset from a center of the first arm the second arm defines a second vertical tunnel within a sidewall of the second arm; a pressure cap positioned within a cavity of the body between the first arm and the second arm; a first spring positioned within the first vertical tunnel; and a second spring positioned within the second vertical tunnel, wherein the first spring and the second spring are configured to apply a downward force on the pressure cap relative to the body.

In some embodiments, the implant further includes: a first biasing member comprising a first pin attached to a first cross pin such that the first cross pin extends transverse to the first pin, wherein: the pressure cap comprises a lateral surface defining a first pin engagement feature, a first end of the first cross pin engages the first pin engagement feature, a proximal end of the first pin is positioned within the first vertical tunnel, and the first spring is configured to apply the downward force on the pressure cap via the first biasing member.

In some embodiments, the implant further includes: a second biasing member comprising a second pin attached to a second cross pin such that the second cross pin extends transverse to the second pin, wherein: the lateral surface of the pressure cap further defines a second pin engagement feature, a first end of the second cross pin engages the second pin engagement feature, a proximal end of the second pin is positioned within the second vertical tunnel, and the second spring is configured to apply the downward force on the pressure cap via the second biasing member. In some embodiments, the first arm comprises an external surface defining a first tool engagement feature, the first vertical tunnel is offset from the first tool engagement feature, the second arm comprises an external surface defining a second tool engagement feature, and the second vertical tunnel is offset from the second tool engagement feature.

In some embodiments, the implant further includes: an expandable ring positioned within the cavity of the body and adjacent to the base of the body and the pressure cap. In some embodiments, an interior surface of the base of the body is configured to: restrict the expandable ring from expanding when the expandable ring is in a first vertical position relative to the body; and allow the expandable ring to expand to accept a head of a bone screw when the expandable ring is in a second vertical position relative to the body, the second vertical position being proximal to the first vertical position. In some embodiments, the first tunnel and/or the second tunnel may be offset from a center of their respective arms.

According to another embodiment of the present disclosure, a method for assembling an implantable device includes: providing a body comprising a sidewall defining: a passage extending within the sidewall and parallel to a vertical axis of the body; and a slot in communication with the passage; positioning a pressure cap within a cavity of the body, the pressure cap comprising a lateral surface defining a pin engagement hole; positioning a spring within the passage of the body; compressing the spring proximally within the passage; retaining the spring in a compressed state such that the compressed spring is disposed proximal of the pin engagement hole of the pressure cap; inserting a first pin through the slot of the body and in the pin engagement hole of the pressure cap, wherein the first pin defines a bore extending through the first pin and transverse to a central axis of the first pin; and inserting a second pin into the passage of the body, through the bore of the first pin, and into the spring.

It is to be understood that both the foregoing general description and the following drawings and detailed description are exemplary and explanatory in nature and are intended to provide an understanding of the present disclosure without limiting the scope of the present disclosure. In that regard, additional aspects, features, and advantages of the present disclosure will be apparent to one skilled in the art from the following. One or more features of any embodiment or aspect may be combinable with one or more features of other embodiment or aspect.

BRIEF DESCRIPTION OF THE DRAWINGS

The accompanying drawings illustrate implementations of the systems, devices, and methods disclosed herein and together with the description, serve to explain the principles of the present disclosure.

FIG. 7A is a cross-sectional view of an implantable device shown before a modular assembly procedure in accordance with an embodiment of the present disclosure.

FIG. 7B is a cross-sectional view of the implantable of FIG. 7A device shown during a modular assembly procedure in accordance with an embodiment of the present disclosure.

Figure 1:
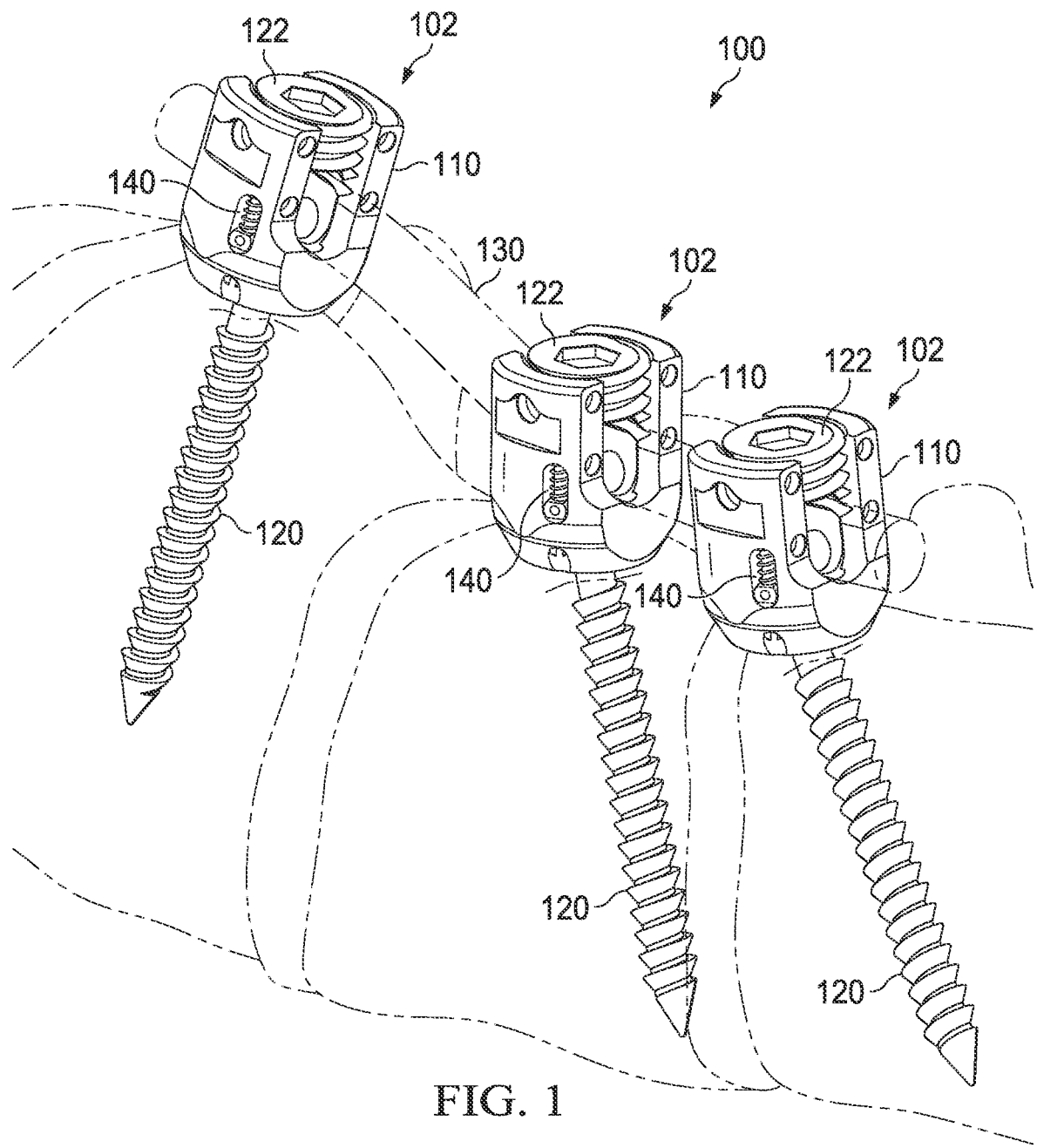
FIG. 1 is a perspective view of a spinal fixation system including friction-fit implantable devices and a connecting rod in accordance with an embodiment of the present disclosure.

These figures will be better understood by reference to the following Detailed Description.

DETAILED DESCRIPTION

For the purpose of promoting an understanding of the principles of the present disclosure, reference will now be made to the implementations illustrated in the drawings and specific language will be used to describe them. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In addition, this disclosure describes some elements or features in detail with respect to one or more implementations or figures, when those same elements or features appear in subsequent figures, without such a high level of detail. It is fully contemplated that the features, components, and/or steps described with respect to one or more implementations or figures may be combined with the features, components, and/or steps described with respect to other implementations or figures of the present disclosure. For simplicity, in some instances the same or similar reference numbers are used throughout the drawings to refer to the same or like parts.

FIG. 1 is a perspective view of a spinal fixation system 100 including a plurality of implantable devices 102 coupled to respective vertebrae of a patient's spine by a plurality of screws 120. Each implantable device 102 in FIG. 1 includes a receiver body 110, a set screw 122, and a biasing member 140. The implantable devices 102 are coupled to one another by a rod 130 positioned in U-shaped slots or saddles of the receiver bodies 110. The rod 130 may be sized, shaped (e.g., bent, curved), and otherwise structurally configured to correct a spinal deformity, and/or to retain the vertebrae in a fixed position. The positions and orientations of the implantable devices 102 relative to the rod 130 and the screw 120 are fixed by the set screws 122. For example, the screws 120 may include spherical, semi-spherical, or otherwise round screw heads seated within the implantable devices 102. The implantable devices 102 may be configured to rotate, tilt, swivel, twist, and/or otherwise move relative to the screw heads of the screws 120. With the screws 120 fixed to the vertebrae, a physician may move the implantable devices 102 into the orientation shown in FIG. 1 to receive the rod 130. The set screws 122 can then be tightened down to compress the rod 130 and the screw heads of the screws 120 against the base of the receiver bodies 110 to fix the position and orientation of the receiver bodies 110 relative to the rod 130 and screws 120.

Each implantable device 102 further includes at least one biasing member 140 disposed within a passage, cavity, or chamber in at least one sidewall of the receiver body 110. The biasing members 140 are configured to apply a downward force on a pressure member of the receiver body 110. The pressure member will be described further below. The pressure member may include a distal surface configured to engage the screw head of the screw 120. In some aspects, the downward force applied to the screw head can cause a base or underside of the screw head to form a friction fit with the base of the receiver body 110, or with an inner surface of a split ring disposed within the receiver body 110. The frictional force (e.g., static friction) induced by the biasing members 140 may be sufficient to retain the position and orientation of the implantable devices 102 relative to the screw heads. For example, the friction may be sufficient to overcome gravitational forces acting on the implantable devices 102 to keep the implantable devices 102 from drooping, sagging, or sliding after the physician has positioned the implantable devices 102 in alignment to receive the rod 130. Additionally, as explained below, the implantable devices 102 may allow for bottom-loading of the screws 120 into a distal opening of the receiver bodies 110. In some aspects, a physician may load the screws 120 into the implantable devices 102 to form an implantable assembly prior to inserting and driving the screws 120 into the patient's bone. The bottom-loading style of the assembly may be referred to as a modular assembly. The bottom-loaded modular assembly may be advantageous, in some aspects. For example, the modular assembly style of the implantable devices 102 may allow for the physician to choose a type and/or size of screw and assemble the implantable device 102 and screw 120 during a spinal fixation procedure, based on the patient's anatomy and indications. The modular style may also allow for quick and efficient assembly with little or no disassembly of the implantable device 102.

Figure 2:
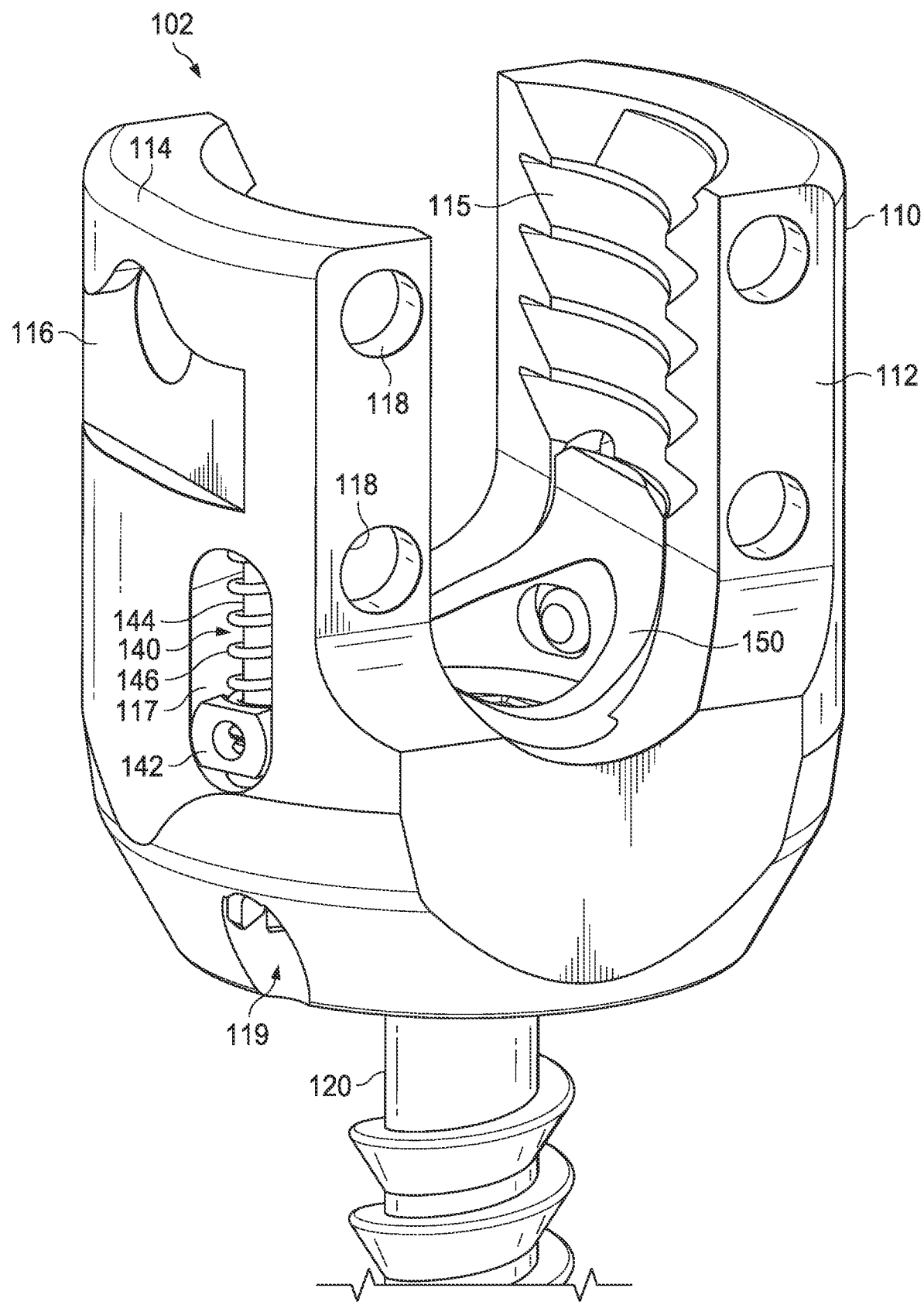
FIG. 2 is a perspective view of an implantable device coupled to a bone screw in accordance with an embodiment of the present disclosure.

FIG. 2 is a perspective view of an implantable device 102 coupled to a bone screw 120. In some aspects, the implantable device 102 and the coupled bone screw 120 may be referred to as an implantable assembly or subassembly. The implantable device 102 includes a receiver body 110 including opposing sidewalls 112, 114 defining a U-shaped slot or saddle. The sidewalls 112, 114 may be referred to as arms, wings, or any other suitable term. The receiver body 110 is configured to receive a connecting rod via the U-shaped slot. The implantable device 102 also includes a biasing member or biasing assembly 140. The biasing member 140 is visible through a slot 117 in the sidewall 114 of the receiver body 110. The implantable device 102 also includes a pressure member 150, which may also be referred to as a pressure cap. The pressure member 150 includes a concave upper surface or top surface for receiving the connecting rod, as described above. The pressure member 150 may also include a concave surface on the bottom side of the pressure member 150 to contact and engage a top surface of a screw head of the screw 120. The biasing member 140 is configured to apply a downward force on the pressure member 150 to provide a friction fit of the implantable device 102 with the screw head of the screw 120.

The receiver body 110 includes a first engagement feature 116 and a plurality of second engagement features 118. The engagement features 116, 118 may provide for releasable engagement with a tool for inserting, positioning, and/or removing the implantable device 102. For example, the engagement features 116, 118 may provide for releasable engagement with a tool for inserting the subassembly including the implantable device 102 and the connected screw 120, and driving the screw 120 into the patient's bone (e.g., vertebra). In the illustrated embodiment, the first engagement feature 116 is centered with the sidewall 114. It will be understood that the other sidewall 112 may also include an engagement feature similar or identical to the engagement feature 116 on the sidewall 114. The engagement feature on the other sidewall 112 may also be centered on the sidewall. The centering of the engagement feature 116 may be beneficial for robust engagement with the insertion tool. For example, the centered placement of the engagement feature 116 may allow for a deeper groove or impression of the engagement feature 116 into the sidewall 114. The slot 117 is offset from the center of the sidewall 114. In this regard, the slot 117 may avoid at least part of the area of the first engagement feature 116, which may be a relatively thinner portion of the sidewall 114. In some aspects, the off-center position of the slot 117 and the biasing member 140 may avoid a potential weak point or failure point of the receiver body 110. In this regard, the slot 117 is in communication with a vertical passage, channel, or tunnel, which may extend from a bottom or distal opening 119 to an upper region of the sidewall 114, which is above the slot 117. The vertical passage will be described further below with respect to FIGS. 7A and 7B. Because the upper portion of the sidewall 114 is thinner in the region of the first engagement feature 116, a centered position of the slot 117 and the vertical channel in which the biasing member 140 is placed would potentially result in an area of thin material near the engagement feature 116. The area of thin material may be a potential failure point of the receive body 110. Accordingly, the offset position of the slot 117 and biasing member 140 advantageously maintains the structural integrity of the receiver body 110.

Further, the offset position of the slot 117 and passageway for the biasing member 140 may allow the passageway to extend further proximally in the sidewall 114. For example, because the offset position of the slot 117 and passageway may not result in the potential weak point described above, the passageway can extend further up the sidewall 114 beside the engagement feature 116, as will be shown in FIGS. 7A and 7B below. The greater length of the passageway may allow for springs with desirable characteristics (e.g., spring constant, stress-strain profile, etc.) to be used for the friction fit mechanism. However, in other embodiments of the present disclosure, the passageways and biasing members 140 are aligned with the centers of the corresponding sidewalls 112, 114.

The receiver body 110 further includes internal threads 115 on the interior surfaces of the sidewalls 112, 114. The threads 115 may be configured to engage corresponding threads on a set screw (e.g., 122, FIG. 1). The set screw may be tightened down into the receiver body 110 to compress the connecting rod onto the pressure member 150. Compressing the pressure member 150 may also cause the pressure member 150 to put additional pressure onto the screw head of the screw 120 to fix the implantable device 102 in a desired position and orientation.

The biasing member 140, or biasing assembly, includes a cross pin 142, a pin 144, and a spring 146. The cross pin 142 extends horizontally through the sidewall 114 of the receiver body 110. An outer surface of the cross pin 142 is shown in FIG. 2. The cross pin 142 also includes a second side or distal side, which may engage in engagement feature of the pressure member 150. In this regard, the spring 146 may be configured to apply a downward force on the cross pin 142, such that the cross pin 142 applies the downward force to the pressure member 150. It will be understood that the opposing side of the implantable device 102 may include a second biasing member or biasing assembly similar or identical to the biasing member 140. Accordingly, the biasing members on each side of the implantable device 102 may be configured to apply a balanced, or substantially balanced, downward force on the pressure member 150.

The spring 146 is positioned around the pin 144. The pin 144 may be inserted through the bottom or distal opening 119, and through an opening or bore of the cross pin 142. In some embodiments, the cross pin 142 includes inner threads configured to engage outer threads of the second and 144. Accordingly, the cross pin 142 and the pin 144 may be coupled, connected, and/or fixed to one another via the threads. In some embodiments, the cross pin 142 and the pin 144 are connected to each other by a weld and/or an adhesive, instead of or in addition to the threads. For example, the cross pin 142 may first be coupled to the pin 144 by the threads, and then fixed to one another by a weld. The welding may be accomplished through a hole in the external side or surface of the cross pin 142. For example, the cross pin 142 may be configured to form a press fit with the pin 144. The press fit may be followed by a weld or an adhesive, in some embodiments. In the illustrated embodiment, the cross pin 142 and the pin 144 are coupled to one another in a perpendicular fashion. However, it will be understood that the angle formed by the cross pin 142 and the pin 144 may not be 90°. For example, the angle formed by the cross pin 142 in the pin 144 may be acute (e.g., 80°, 85°, 88°, 89°, etc.) or obtuse (e.g., 91°, 92°, 95°, 100°, etc.). The cross pin 142 and the pin 144 may be configured to translate vertically within the passage in the sidewall 114. In some aspects, the amount of travel allowed for the first biasing member 140 may be associated with or defined by the slot 117, and/or the spring 146. The amount of travel allowed for the cross pin 142, and by association the pressure member 150, may allow for bottom loading of the screw 120. For example, as explained further below, bottom loading of the screw 120 may include inserting the screw head of the screw 120 through a bottom or distal opening of the receiver body 110 to a first vertical position at which the head of the screw can fit within a split ring. The screw 120 may then be moved downward or distally to a second vertical position where in the split ring closes around a base of the screw head due to a tapered base of the receiver body 110. Accordingly, the screw 120 may be locked within the implantable device 102 by the split ring.

The spring 146 may be configured and/or selected to provide sufficient downward force to provide for the friction fit described above. For example, the spring 146 may be configured and/or selected to provide sufficient downward force to the pressure member 150 in combination with a similar or identical biasing member and spring in the other sidewall 112.

In some embodiments, the spring 146 may be sized, shaped, and otherwise structurally configured to operate in a plastic region. Accordingly, during assembly, the spring 146 may experience some permanent deformation. After assembly, the spring 146 may remain functional to induce the frictional forces for the friction fit with the screw head. In some aspects, the spring 146 may be formed of a biocompatible titanium or titanium alloy. In some aspects, the downward force applied by each spring on the cross pin 142 ranges between 0.3-0.8 Newtons at maximum compression. In some aspects, the combined downward force of two biasing members, one in each of the sidewalls 112, 114, ranges between 0.6-1.6 Newtons at maximum compression. Further, the spring 146 may be configured and/or selected to provide sufficient travel to allow for bottom loading of the screw 120. In some embodiments, the spring 146 may comprise a metal, such as titanium, titanium alloy, nitinol, stainless steel, and/or any other suitable metal.

The materials of the implantable device 102 may be biocompatible, and may have other structural characteristics appropriate for use in spinal fixation. For example, the receiver body 110, pressure member 150, cross pin 142, pin 144, spring 146, and/or the screw may include a biocompatible metal, such as stainless steel, titanium, and/or alloys thereof. In other embodiments, one or more components of the implantable device 102 may include a polymer material, such as DELRIN, polyether ether ketone (PEEK), polytetrafluoroethylene (PTFE), polysulfone (PS), polycarbonate, and/or any other suitable polymeric material. One or more components of the implantable device 102 may be manufactured by milling, machining, casting, molding, laser sintering, 3D printing, and/or any other suitable process. The components of the implantable device 102 may be formed of the same materials or of different materials.

Figure 3:
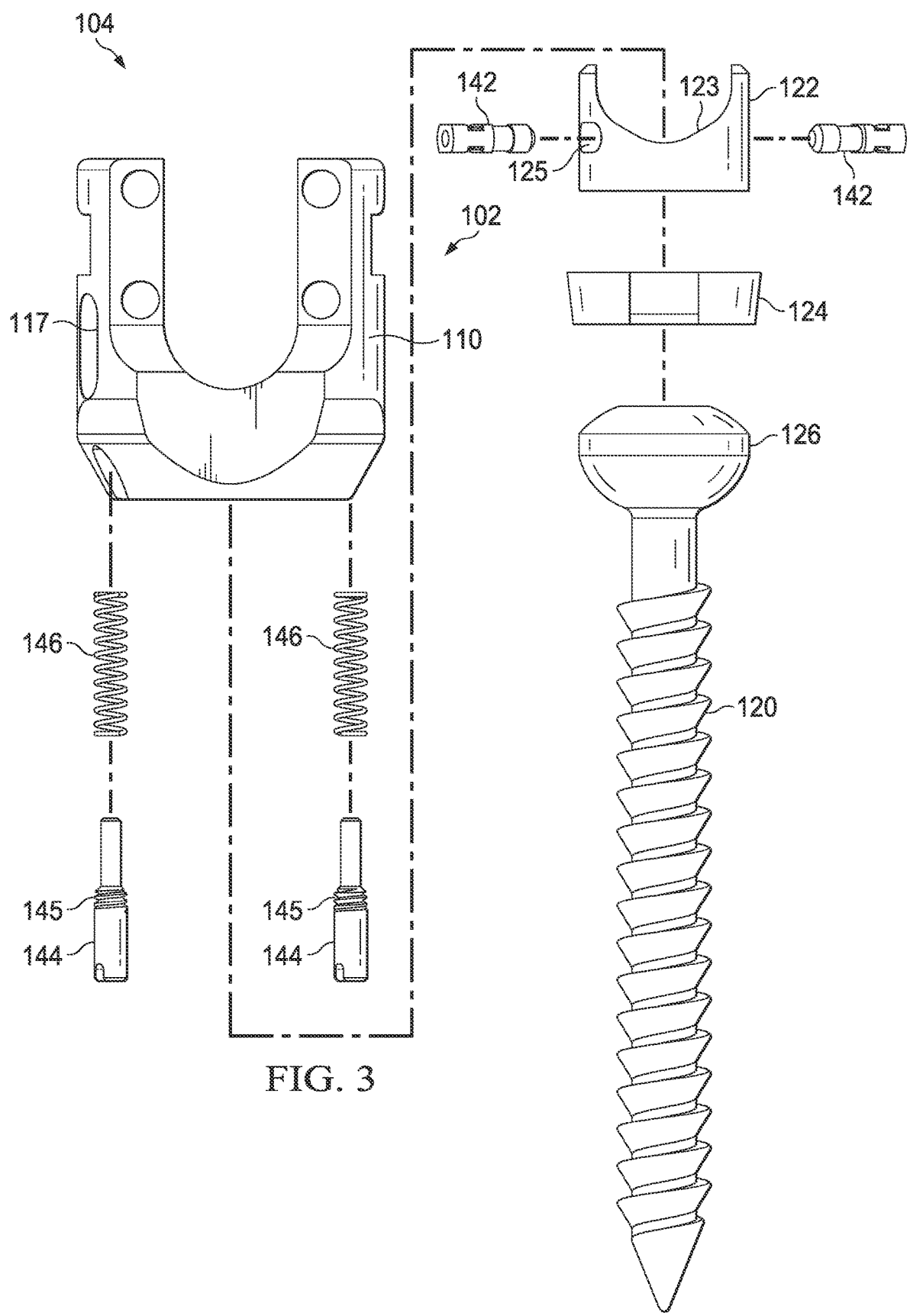
FIG. 3 is an exploded view of the implantable device and bone screw shown in FIG. 2.

FIG. 3 is an exploded view of an implantable assembly 104 including the implantable device 102 and the screw 120 shown in FIG. 2, according to an embodiment of the present disclosure. It will be understood that the ordering or arrangement of the components of the assembly 104 shown in FIG. 3 may not represent the order of assembly of the implantable assembly 104. For example, the components of the assembly 104 shown in FIG. 3 may be arranged based on the relative positions and/or their relationship with the other components of the assembly 104. The assembly includes pins 144 positioned within channels or passageways within the receiver body 110. The channels or passageways of the receiver body 110 may be accessible by distal or bottom openings 119. Springs 146 are positioned around distal shaft portions of the pins 144. The distal shaft portions may have a relatively smaller diameter than a base portion of the pins 144. The pins 144 include threads 145 between the distal shaft portions and the base portions. The threads 145 are external threads, and may be configured to mate with and/or engage corresponding internal threads on the cross pins 142. In some embodiments, the threaded connection between the cross pin 142 and the pin 144 may include a runout, meaning that the threads 145 and/or the threads of the cross pin 142 include a transition section where the depth of the threads decreases. The runout may provide a stop for the threaded connection to facilitate consistent dimensions and relative positions of the pins 142, 144 during assembly.

The receiver body 110 includes or defines a slot 117 and a distal or bottom opening 119. The slot 117 and the bottom opening 119 are offset from a center of the sidewall of the receiver body, as explained above. The other sidewall of the receiver body 110 may also include a corresponding slot and/or bottom opening or distal opening. The corresponding slot and bottom opening of the other sidewall may also be offset from the center of the other sidewall. Accordingly, the slot and/or bottom opening on the other sidewall are not visible in FIG. 3. In some embodiments, the slot 117 and bottom opening 119 are positioned approximately 180° from the other slot and bottom opening on the other sidewall of the receiver body 110. However, in other embodiments, the slots and/or bottom openings in the receiver body 110 may be positioned less than 180° from each other.

The assembly 104 further includes the pressure member 150. The pressure member 150 includes a concave surface 123 configured to receive a connecting rod. The pressure member 150 includes or defines at least one engagement feature 125. In some embodiments, the engagement feature 125 includes a slot or hole extending through a sidewall of the pressure member 150. In other embodiments, the engagement feature 125 includes a recess, groove, protrusion, detent, and/or any other suitable engagement feature configured to engage a surface of at least one cross pin 142. Although only one engagement feature 125 is visible in FIG. 3, it will be understood that the pressure member 150 may include one or more additional engagement features 125 on one or more other sides of the pressure member 150. For example, the pressure member 150 may include an additional engagement feature 125 positioned 180°, or approximately 180°, from the visible engagement feature 125. The engagement feature 125 includes a slot or aperture configured to receive and engage a distal portion of the cross pin 142. Accordingly, the cross pin 142 is configured to apply a downward force on the engagement feature 125 of the pressure member 150.

The pressure member 150 may also include a bottom concave surface configured to engage an upper surface of a screw head 126 of the screw 120. The upper surface of the screw head 126 may include a spherical, aspherical, or otherwise curved shape configured to engage the bottom surface of the pressure member 150. In other embodiments, the screw head 126 may include a conic section shape. Accordingly, the screw head 126 may be curved about at least one axis to allow the screw head 126 to continuously rotate relative to the pressure member 150. In other embodiments, the screw head 126 may include a polygonal shape having a plurality of flat surfaces arranged around an axis of the screw 120. For example, the screw head 126 may include, on the upper surface, 10, 20, 25, 30, or any other suitable number of flat surfaces arranged around the axis of the screw 120. The number of flat surfaces on the upper surface of the screw head 126 may correspond to the number of possible orientations of the implantable device 102 about the longitudinal axis of the screw 120. In some embodiments, the pressure member 150 may include corresponding polygonal surfaces on the bottom side or surface of the pressure member 150.

The assembly 104 further includes a split ring 124. The split ring 124 may include a discontinuous annular shape configured to expand and/or retract to enlarge and/or reduce an inner diameter of the split ring 124. The split ring 124 may be configured to lock the screw 120 into the implantable device 102 once the screw head 126 has been inserted through a bottom opening of the split ring 124. For example, the upper surface of the screw head 126 may be configured to cause the split ring 124 to expand and allow the screw head 126 to pass through the split ring 124. Once the screw head 126 has passed through the split ring 124, the split ring 124 may relax and contract to lock against a bottom curved surface of the screw head 126. In some embodiments, an inner surface of the split ring 124 includes a ridge or seating feature configured to engage the bottom surface of the screw head 126.

The screw 120 includes a distal threaded shaft comprising screw threads configured to drive into and engage the patient's bone. In the illustrated embodiment, the threads are right-handed threads. In other embodiments, the threads may be left-handed threads. The threads may have any suitable pitch, depth, and/or other geometric characteristics based on the target bone or tissue and application for the assembly 104. The screw 120 may be machined, laser sintered, 3D printed, or otherwise manufactured by any suitable manufacturing process. It will be understood that the threaded portion of the shaft of the screw 120 may extend a greater or lesser portion of the shaft than what is shown in FIG. 3.

Figure 4:
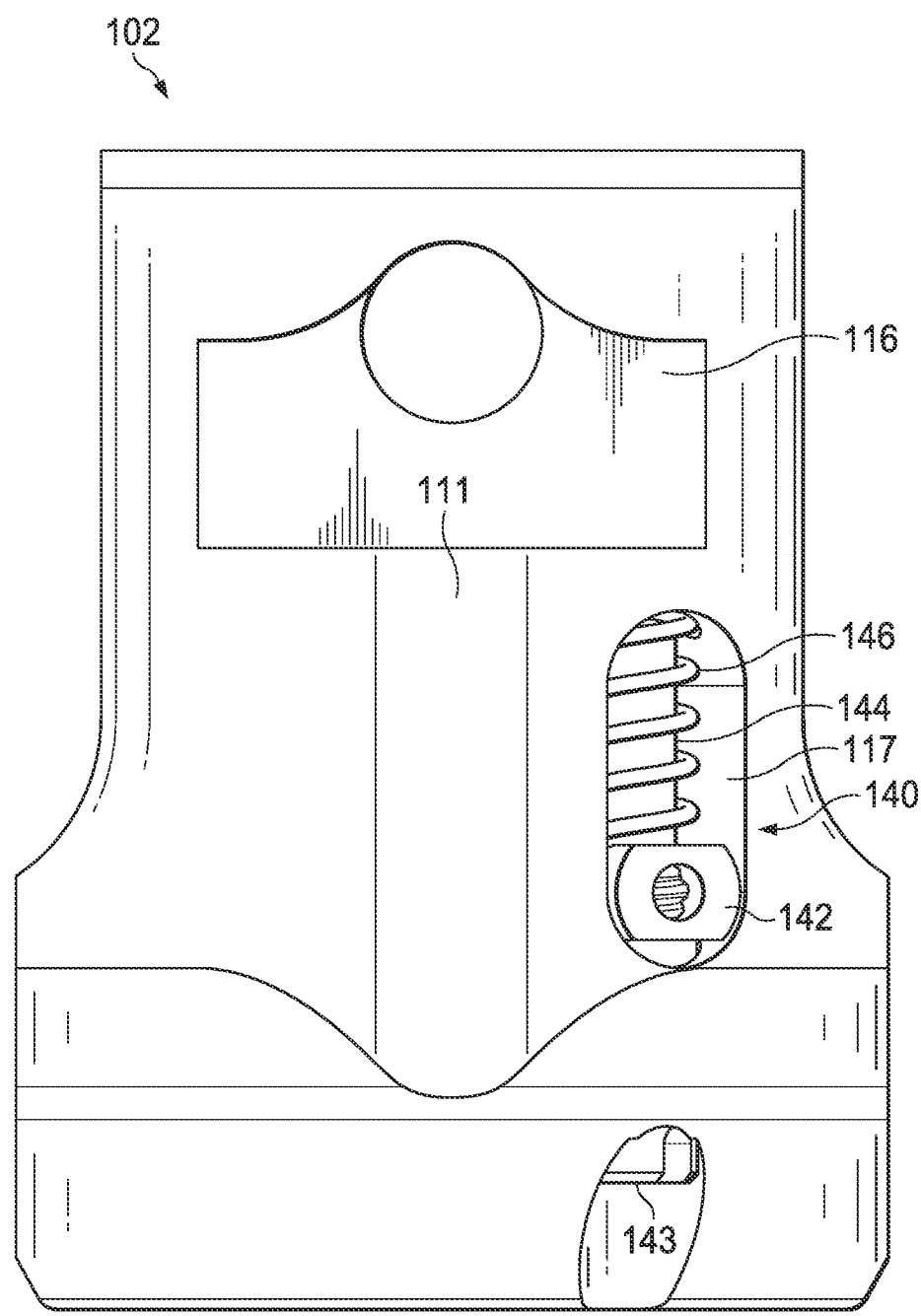
FIG. 4 is a lateral elevation view of the implantable device shown in FIG. 2.

FIG. 4 is a side elevation view of the implantable device 102, according to an embodiment of the present disclosure.

FIG. 4 shows a sidewall of the receiver body, including an engagement feature 116, and a slot 117. The sidewall shown in FIG. 4 may be either of the sidewalls 112, 114 shown in FIG. 2. The biasing member 140, including the cross pin 142, the pin 144, and the spring 146, are positioned within the vertical channel of the sidewall of the receiver body 110. An outer portion of the cross pin 142 is positioned to translate vertically within the slot 117. Accordingly, the slot 117 may at least partially define the travel allowed for the cross pin 142. The pin 144 includes a bottom portion 143. The bottom portion 143 is positioned within the distal opening 119 of the sidewall. The bottom portion 143 may include a coupling feature to rotate the pin 144 within the channel and engage the threads of the cross pin 142. For example, the bottom portion 143 may include a feature for a flat head screwdriver head, Phillips screwdriver head, hex key, TORX screwdriver head, square screwdriver bit, or any other suitable coupling feature. The receiver body 110 further includes a flat surface or milled surface 111 centered with the sidewall and extending vertically down the receiver body 110. The flat surface 111 may reduce the outer profile of the receiver body 110, in some aspects.

Figure 6:
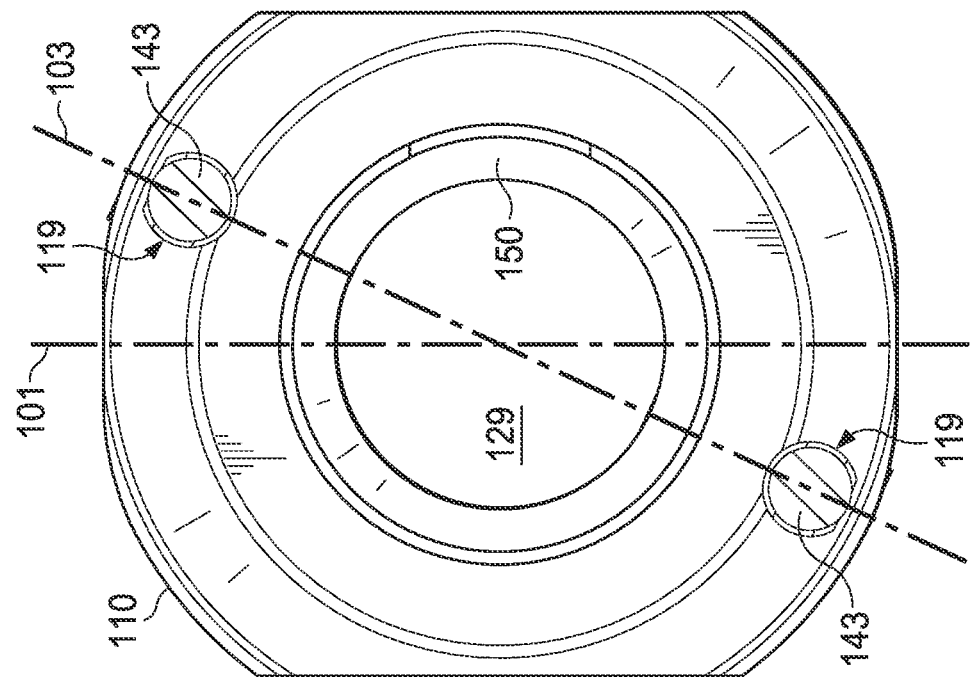
FIG. 6 is a bottom plan view of the implantable device shown in FIG. 2.
Figure 5:
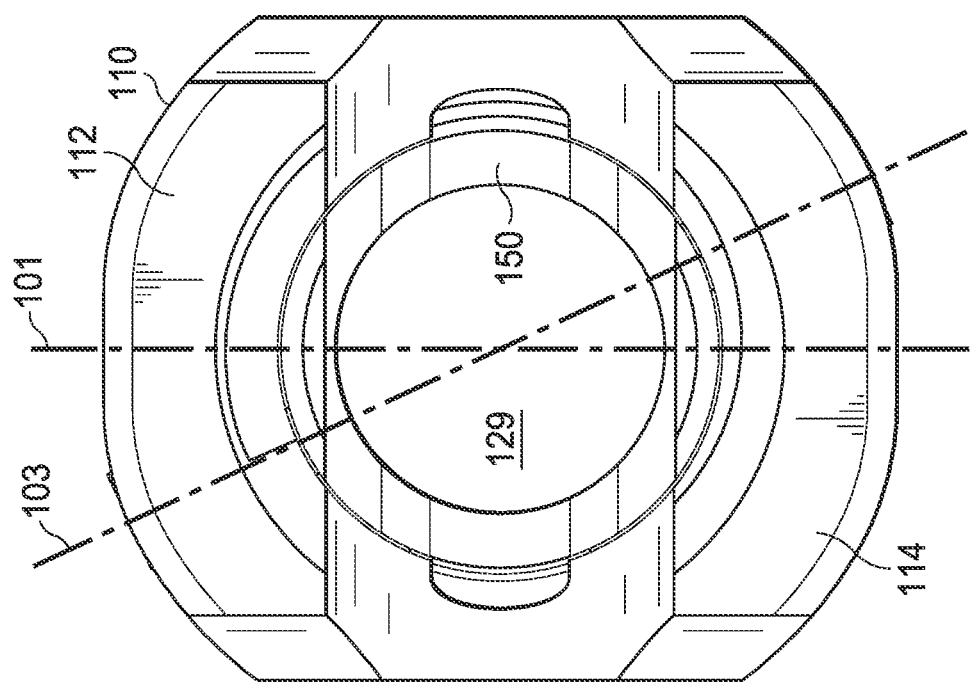
FIG. 5 is a top plan view of the implantable device shown in FIG. 2.

FIGS. 5 and 6 illustrate the relative orientations of the passageways or channels of an implantable device 102 for receiving the biasing members 140, according to an embodiment of the present disclosure. FIG. 5 is a top plan view of the implantable device 102, and FIG. 6 is a bottom plan view of the implantable device 102. Referring to FIG. 5, the receiver body 110 includes a first horizontal axis 101 extending through the centers of the sidewalls 112, 114. The receiver body 110 includes an opening 129. The opening 129 may be at or near a center of the receiver body 110. The opening 129 may be configured to receive a screw head and/or a screw shaft of a bone screw. The opening 129 may be further configured to provide access for a screwdriver or other tool to drive the screw into the patient's bone and/or tissue. A pressure member 150 is positioned within the receiver body such that the saddle of the pressure member 150 is aligned with the U-shaped slot of the receiver body 110.

As illustrated above, the receiver body 110 may include or define an engagement features (e.g., 116, FIG. 2) to engage with a positioning tool. The engagement feature(s) may be aligned with the axis 101. The receiver body 110 further includes a second axis 103 of three intersecting with the first axis 101. The second axis 103 is non-parallel with the first axis 101. The second axis 103 may represent the orientation of the passageways or channels for receiving the biasing members 140. For example, referring to FIG. 6, the receiver body 110 includes or defines distal openings 119 centered on the second axis 103. The distal openings 119 may provide access to insert one or more components of the biasing members 140. For example, the springs 146 and pins 144 of biasing assemblies may be inserted into their respective passageways or channels in the receiver body 110 through the distal openings 119. In some embodiments, the second axis 103 may be offset from the first axis 101 by 20°, 25°, 30°, 35°, 40°, or any other suitable amount, both greater or smaller.

FIGS. 7A and 7B are cross-sectional views of an implantable device 102 before and during a modular assembly, according to an embodiment of the present disclosure. In some embodiments, the implantable device 102 may be configured for assembly before or during a surgical procedure. For example, the physician may select the screw 120 based on the patient's anatomy and indications. In some embodiments, the screw 120 may be selected after the surgery has begun and after the surgeon has created an access through the patient's tissue to the bone. In other instances, the physician and/or surgeon may select the screw 120 before the surgery based on medical images of the patient's anatomy (e.g., x-ray, computed tomography, magnetic resonance imaging).

The cross-sectional views of FIGS. 7A and 7B are taken along the second axis 103 shown in FIGS. 5 and 6. Accordingly, the cross-sectional views of FIGS. 7A and 7B show the access channels or passageways 141 in both sidewalls 112, 114 of the receiver body 110. Referring to FIG. 7A, the biasing members 140 are shown in a first position prior to insertion of the screw 120. In the first position, the biasing members 140 are fully extended such that the outer portions of the cross pins 142 are seated on the bottoms of the openings 119. Accordingly, the springs 146 are in a relatively uncompressed or extended state. The pins 144 are coupled to the cross pins 142 such that the threads 145 of the pins 144 engage corresponding threads 147 of the cross pins 142. In the first position shown in FIG. 7A, the bottom portions 143 of the pins 144 are shown at or near the distal openings 119. The split ring 124 is seated within a conical base of the receiver body 110. In FIG. 7A, the split ring 124 is in an unexpanded state.

The passageways 141 in the sidewalls 112, 114 of the receiver body 110 extend from the distal openings 119 to proximal ends 149. Accordingly, in the illustrated embodiment, the passageways 141 do not extend completely through the sidewalls to the top surface or proximal surface of the receiver body 110. However, in other embodiments, the passageways 141 may extend completely through the sidewalls 112, 114 to the top surface of the receiver body. Accordingly, there may be multiple access points for assembling and/or adjusting the biasing members 140. In some aspects, the passageways 141 may be referred to as tunnels, channels, or cavities, for example. The length of the passageways 141 may allow for springs with desirable characteristics to be used. For example, the larger passageways may allow for titanium springs to operate in a plastic region while applying an amount of force suitable to create a friction fit (e.g., 0.3-0.8 Newtons for each spring at maximum compression). Titanium may have beneficial biocompatibility characteristics for use in implants.

In the first state shown in FIG. 7A, the split ring 124 may be limited in vertical motion by the pressure member 150. In some embodiments, there may be some clearance between the split ring 124 and the pressure member 150. In other embodiments, there may be no clearance between the split ring 124 and the pressure member 150.

Referring to FIG. 7B, the implantable device 102 is shown during a modular assembly with the biasing members 140 and a second vertical position. By inserting the screw head 126 through the bottom opening of the receiver body 110, the screw head moves the split ring 124 and the pressure member 150 upward by a distance 105. As a result, the pins 144 and cross pins 142 are translated upward to a second vertical position to compress the springs 146 within the passageways 141. With the split ring 124 translated upward within the receiver body 110, the split ring 124 has room to expand to allow the screw head 126 to pass through the split ring 124. With the split ring 124 around the screw head 126, the bottom surface of the pressure member 150 engages a top surface of the screw head 126. If the physician or technician removes the upward force on the screw 120, the biasing members 140 can apply a downward force on the pressure member 150, and as a result to the screw head 126 and the split ring 124. The downward force may result in the frictional force between the pressure member 150 and the screw head 126. The screw head 126 and split ring 124 may translate downward until the outer tapered surfaces of the split ring 124 contact the inner tapered surface of the receiver body 110. In some embodiments, the modular assembly shown in FIGS. 7A and 7B may be non-reversible, such that the screw 120 may not be removed after it has been inserted into the implantable device 102, as shown in FIG. 7B. In other embodiments, the modular assembly shown in FIGS. 7A and 7B may be reversible, such that the screw 120 may be removed after assembly.

Figure 8A:
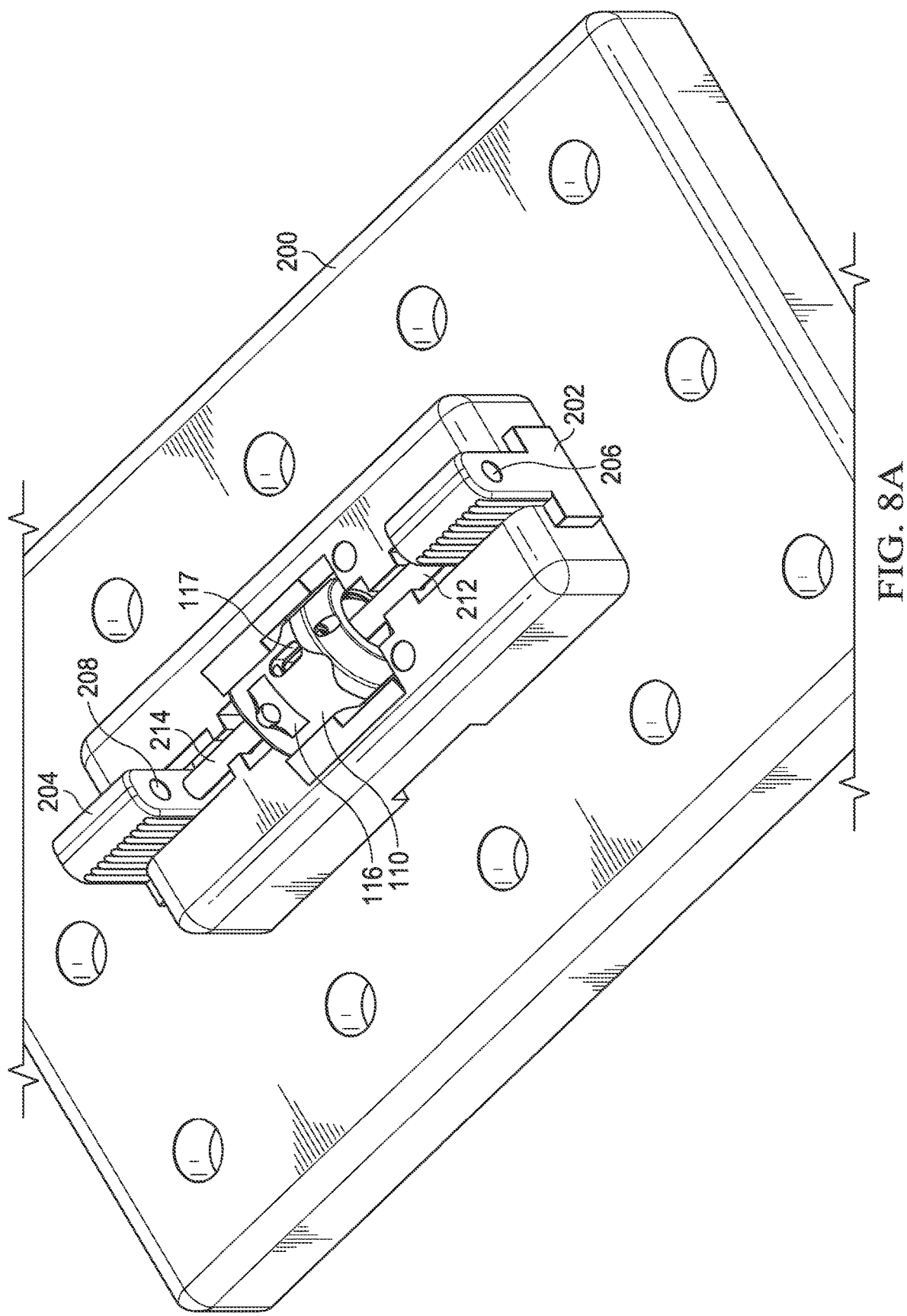
FIG. 8A is a perspective view of an implantable device shown in an assembly device during an assembly procedure in accordance with an embodiment of the present disclosure.

FIGS. 8A-8F illustrate an assembly process for an implantable device, such as the implantable device 102 shown in FIGS. 1-7B. The assembly process shown in FIGS. 8A-8F includes or involves an assembly device 200 or assembly jig. The assembly device 200 includes a first mandrel 212 having a first control piece 202, and a second mandrel 214 having a second control piece 204. The first control piece 202 includes a first through hole 206. The second control piece 204 includes a second through hole 208. The mandrels 212, 214 may support and retain components of the implantable device in place during assembly. FIG. 8A is a perspective view of the receiver body 110 positioned within the assembly device 200. The receiver body 110 is positioned with in the assembly device 200 such that the slot 117 is facing upward and centered between the lateral sides of the assembly device 200. The engagement feature 116 is also facing upward and off of center.

Figure 8B:
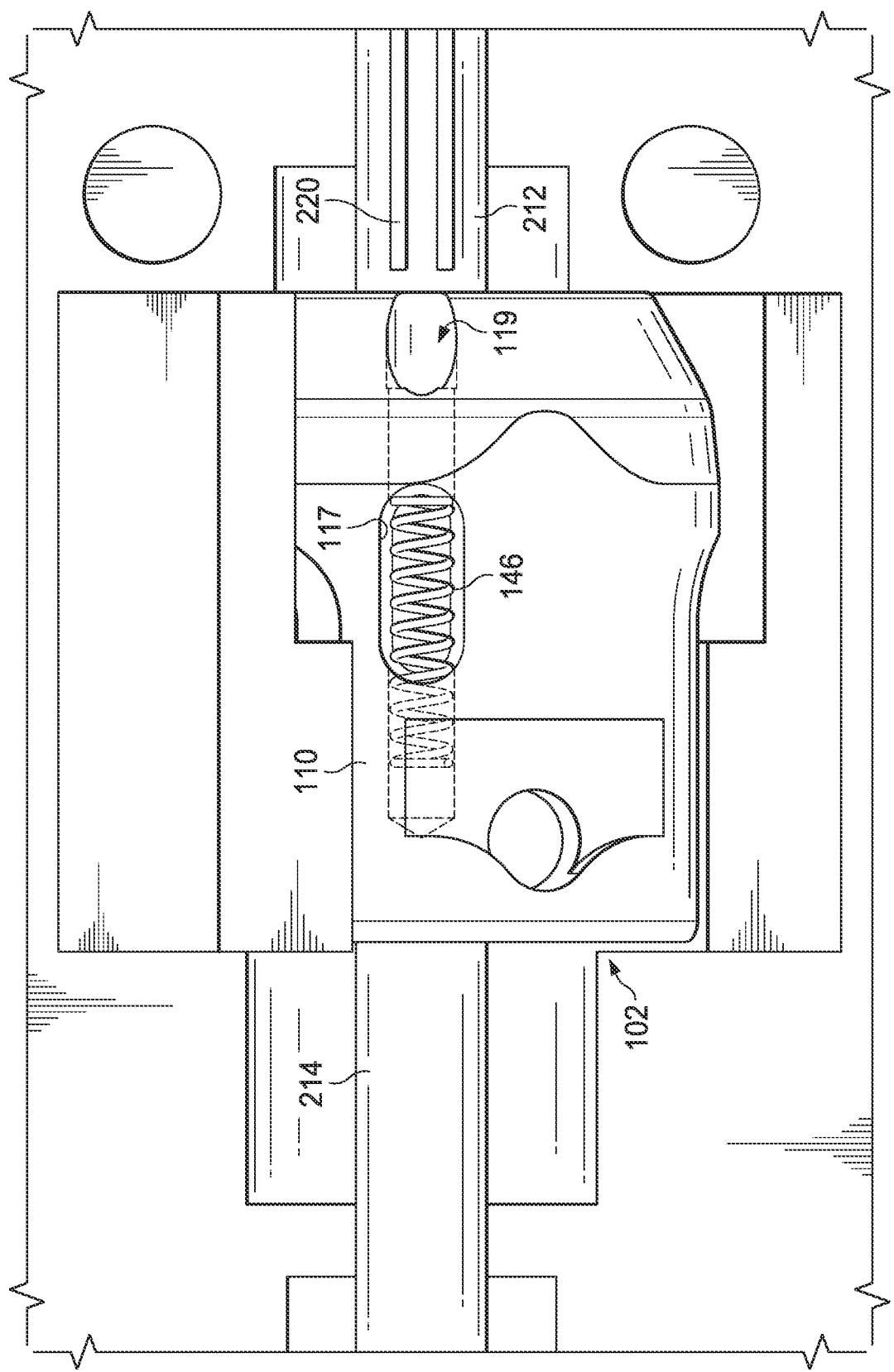
FIG. 8B is a top plan view of the implantable device of FIG. 8A shown during a first stage of the assembly procedure in accordance with an embodiment of the present disclosure.

FIGS. 8B-8F are top plan views of the receiver body 110 in the assembly device 200 during various stages of the assembly process. Referring to FIG. 8B, the implantable device 102 is shown in a first stage of the assembly process. A split ring and a pressure member, such as the split ring 124 and the pressure member 150 shown in FIG. 3, may be positioned within the receiver body 110. Accordingly, the first stage of the assembly process may include providing the receiver body 110, where the receiver body includes a passage extending with in a side wall. The passage may extend parallel to a vertical axis of the body the side wall of the receiver body 110 may further define the slot 117 in communication with the passage. The first stage of the assembly process may further include positioning the pressure member or pressure within a cavity of the receiver body 110. The pressure member may include a lateral surface defining a pin engagement hole. With the receiver body 110 positioned within the assembly device 200 such that the distal opening 119 and slot 117 are centered and aligned with the mandrels 212, 214, a first tool 220 can be used to insert a spring 146 into a chamber of the receiver body 110 through the distal opening 119. For example, the first tool 220 may be inserted through the first through hole 206 shown in FIG. 8 a.

Figure 8C:
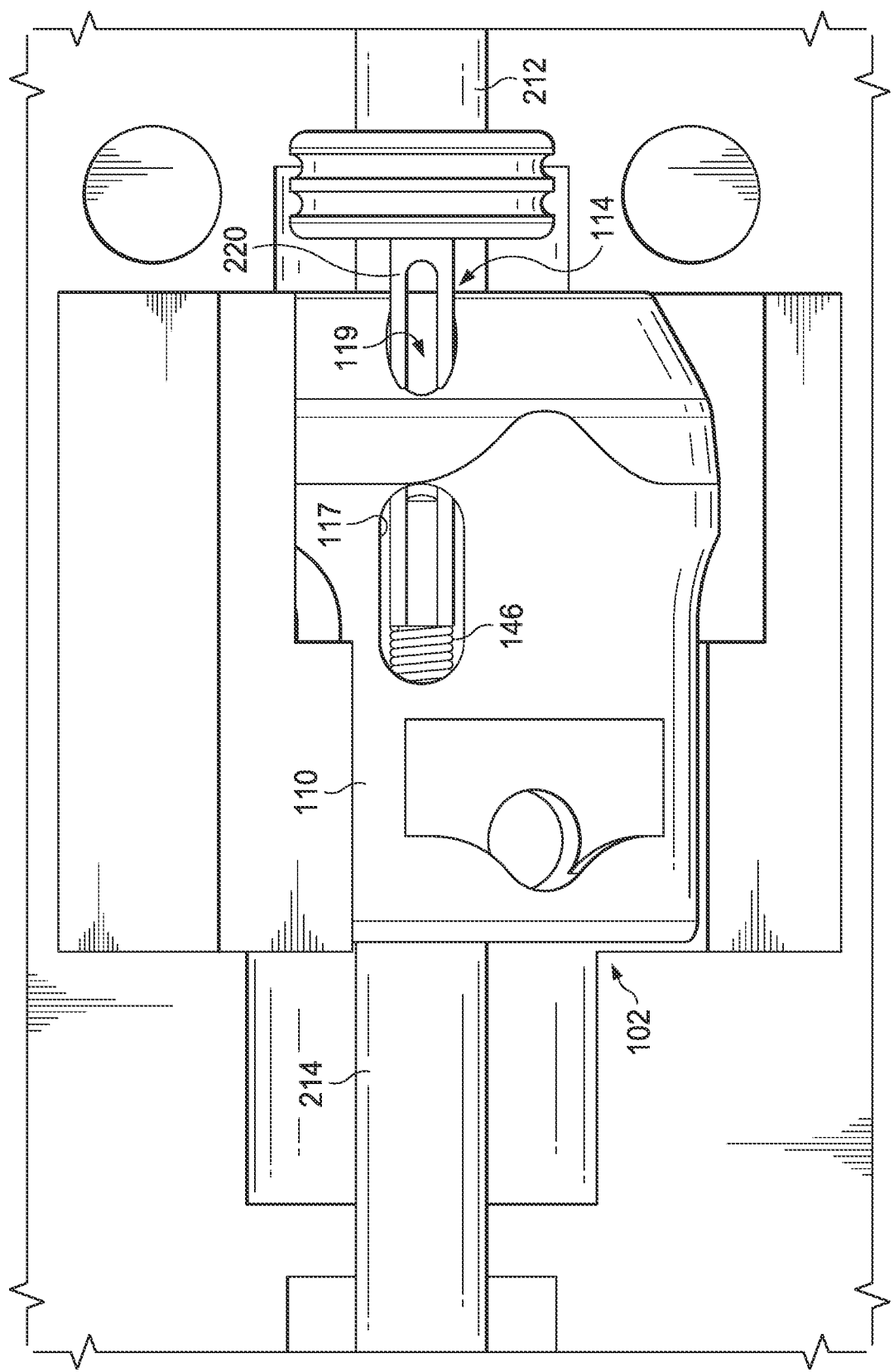
FIG. 8C is a top plan view of the implantable device of FIG. 8A shown during a second stage of the assembly procedure in accordance with an embodiment of the present disclosure.

Referring to FIG. 8C, the implantable device 102 is shown during a second stage of the assembly procedure. The first tool 220 is advanced into the passageway of the receiver body 110 to compress the spring 146 against a proximal end of the passageway. The compressed spring 146 is seen through the slot 117. The first tool 220 may be advanced through the opening 119 by sliding the first control piece 202 over the mandrel 212 toward the receiver body 110.

Figure 8D:
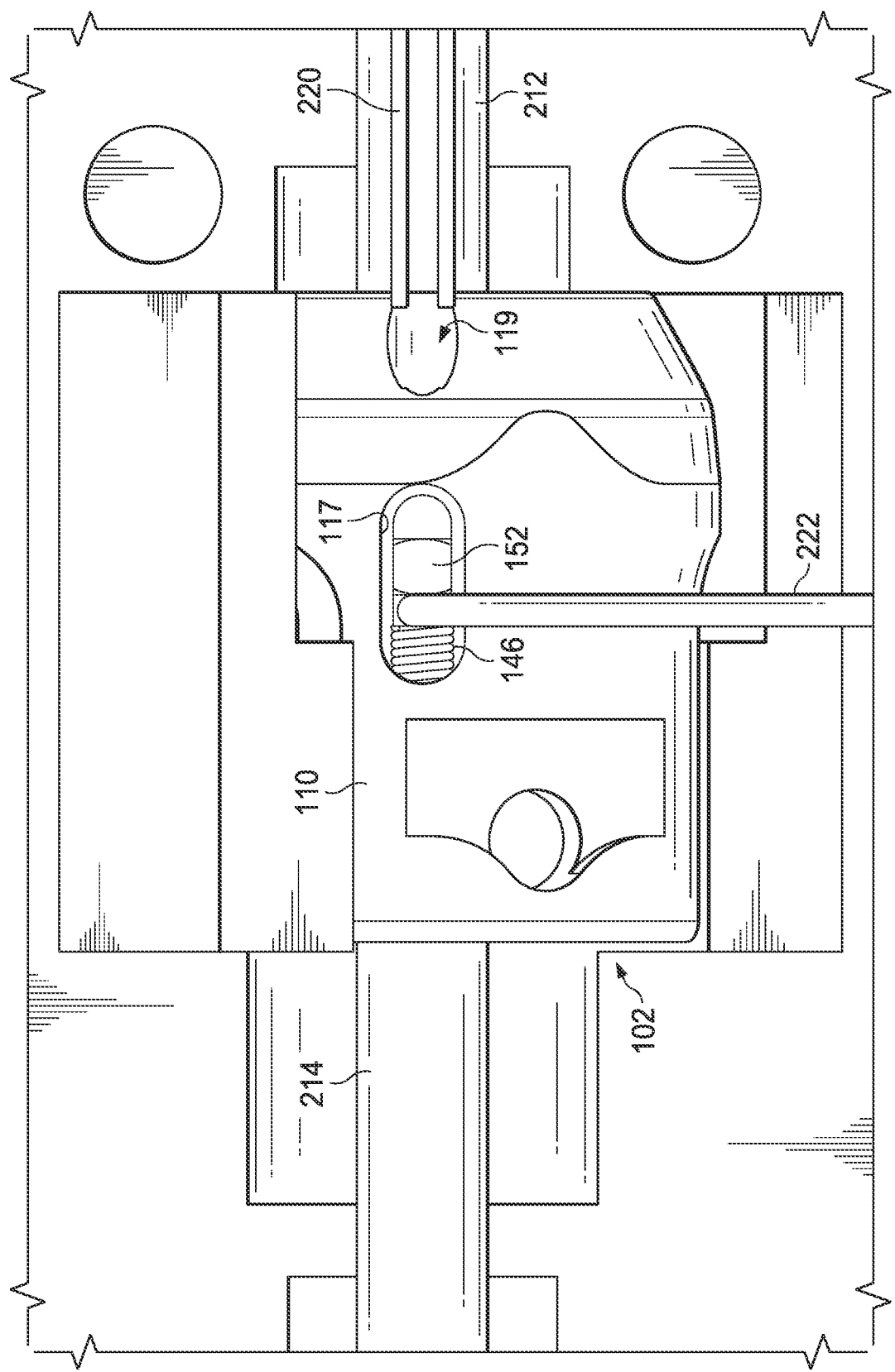
FIG. 8D is a top plan view of the implantable device of FIG. 8A shown during a third stage of the assembly procedure in accordance with an embodiment of the present disclosure.

Referring to FIG. 8D, the implantable device 102 is shown during a third stage of the assembly procedure. A second tool 222 is inserted into the slot 117 to retain the spring 146 in the compressed state. The second tool 222 may include a pick, hook, or any other suitable type of tool to retain the spring 146 in the compressed state, as shown in FIG. 8D. In some embodiments, the second tool 222 is coupled to the assembly device 200 so that the second tool 222 can keep the spring 146 in the compressed state in a hands-free fashion. The spring 146 is compressed such that the entirety of the spring 146 is proximal of a pin engagement hole 152 of the pressure member.

Figure 8E:
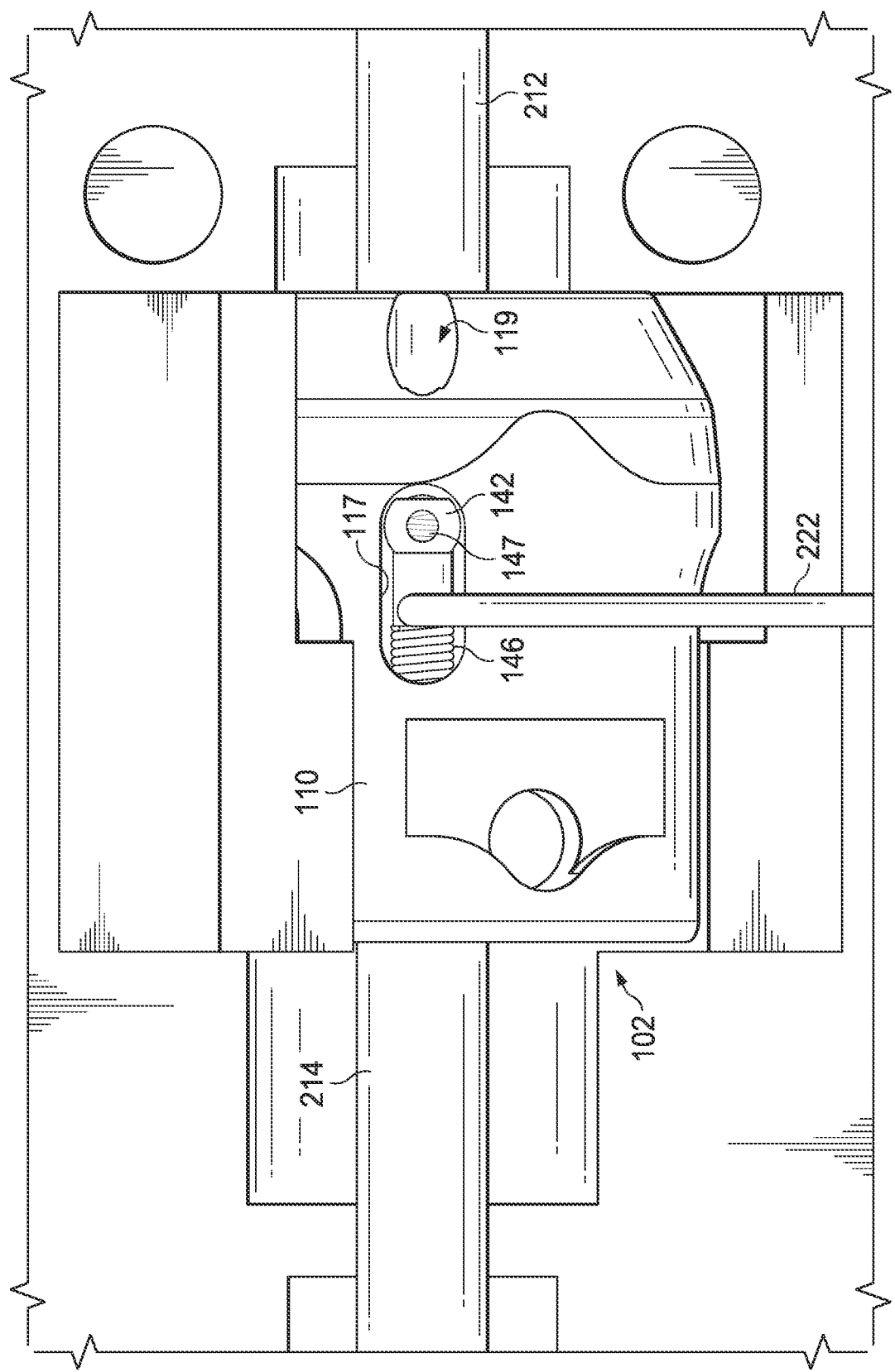
FIG. 8E is a top plan view of the implantable device of FIG. 8A shown during a fourth stage of the assembly procedure in accordance with an embodiment of the present disclosure.

Referring to FIG. 8E, the implantable device 102 is shown during a fourth stage of the assembly procedure. While the second tool 222 keeps the spring 146 in the compressed state, a cross pin 142 is inserted through the slot 117 such that a distal portion of the cross pin 142 is inserted into the pin engagement hole 152 shown in FIG. 8D. The cross pin 142 includes a bore extending laterally through the cross pin 142. The bore is transverse to a central axis of the cross pin 142. The bore includes internal threads 147 configured to engage corresponding external threads 145 of a pin 144, as explained below.

Figure 8F:
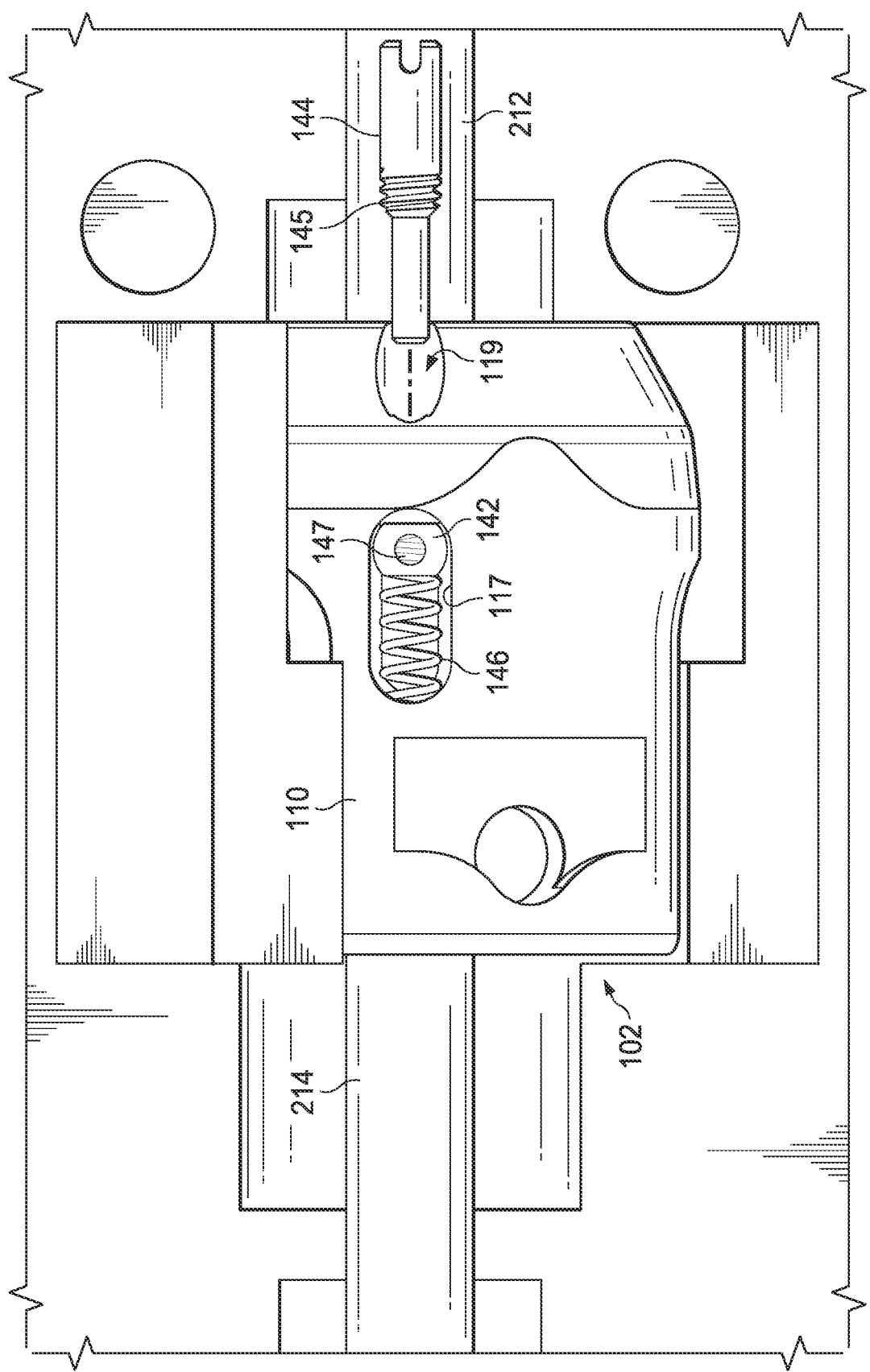
FIG. 8F is a top plan view of the implantable device of FIG. 8A shown during a fifth stage of the assembly procedure in accordance with an embodiment of the present disclosure.

Referring to FIG. 8F, the implantable device 102 is shown during a fifth stage of the assembly procedure. A pin 144 is inserted through the opening 119 into the passageway of the receiver body 110. The pin 144 may be inserted by the tool 220, in some embodiments. In other embodiments, the pin 144 may be inserted using a screwdriver. Once the pin 144 has been inserted into the passageway, the pin 144 may be coupled to the cross pin 142 by inserting at least a distal portion of the pin 144 through the bore of the cross pin 142 and rotating the first pin 144 to engage the threads 145 with the threads 147. The screwdriver may then be removed, and the device 102 may be removed from the assembly device 200. The implantable device 102 may then be ready for use and/or assembly by a physician for a spinal fixation procedure.

It will be understood that one or more embodiments described above may be modified in one or more ways without departing from the scope of the present disclosure. For example, although the embodiments described above may include a coil spring 146, it will be understood that any type of biasing device or spring may be used, including a wave spring, elastomeric Bushing, elastomeric band, and/or any other suitable type of biasing device. Further, it will be understood that fewer or more than two biasing members 140 may be used for the implantable device 102. For example, an implantable device may include two, three, four, and/or any other suitable number of biasing members. In some aspects, the cross pin 142 may be coupled are attached to the pin 144 by welding, adhesive, detents, and/or any other suitable type of attachment. In some embodiments, a receiver body 110 may include fewer or more engagement features than the engagement features 116, 118 shown above. In some embodiments, an implantable device 102 may not allow for modular assembly. For example, an implantable device 102 may not include the split ring 124 illustrated above. In this regard, an implantable assembly may be configured such that a bottom surface of the screw head directly contacts a seating surface of the receiver body 110. In some embodiments, the implantable device 102 may include protrusions extending from the pressure member 150, instead of the cross pins 142. For example, the pressure member 150 may include projections extending outward and positionable within the slots 117. The pins 144 may be configured to mate with and/or engage with the projections of the pressure member 150.

Aspects, components, and features described above may be used in a variety of skeletal stabilization and/or fixation systems. For example, although the biasing members 140 described above are shown low-profile, singular receiver body implants, the present disclosure contemplate other types of receiver bodies and spinal implant devices. For example, the biasing members 140 described above, or components of the biasing member 140, may be incorporated into reduction screw receiver bodies, sliding double bodies, closed receiver bodies, and/or any other suitable type of spinal implant or receiver body. Further, although embodiments of the present disclosure may be described as spinal implants or spinal fixation devices, it will be understood that the devices described above may be used for a variety of skeletal stabilization and/or fixation procedures.

Persons of ordinary skill in the art will appreciate that the implementations encompassed by the present disclosure are not limited to the particular exemplary implementations described above. In that regard, although illustrative implementations have been shown and described, a wide range of modification, change, combination, and substitution is contemplated in the foregoing disclosure. It is understood that such variations may be made to the foregoing without departing from the scope of the present disclosure. Accordingly, it is appropriate that the appended claims be construed broadly and in a manner consistent with the present disclosure.

What is claimed is:

1. An implantable device configured to couple to a head of a bone screw, the implantable device comprising:
   a body comprising a sidewall defining:
      a first passage extending within the sidewall and parallel to a vertical axis of the body; and
      a slot extending through the sidewall and in communication with the first passage;
   a pressure member coupled to the body such that the sidewall at least partially surrounds the pressure member, the pressure member comprising a distal surface configured to engage the head of the bone screw; and
   a first resilient biasing member positioned at least partially within the first passage of the body and configured to apply a downward force on the pressure member relative to the body.

2. The implantable device of claim 1, wherein the pressure member comprises a lateral surface defining an engagement feature, and
   wherein the first resilient biasing member comprises:
      a first pin positioned through the slot of the body and in the engagement feature of the pressure member; and
      a spring positioned within the first passage of the body and configured to apply, via the first pin, a downward force on the pressure member relative to the body.

3. The implantable device of claim 2, wherein the engagement feature comprises an opening in the lateral surface of the pressure member.

4. The implantable device of claim 2, wherein the first pin comprises:
   a first portion positioned in the engagement feature; and
   a second portion positioned within the slot.

5. The implantable device of claim 1, wherein:
   the sidewall of the body further defines a second passage extending within the sidewall and parallel to the vertical axis of the body, and
   the implantable device further comprises a second biasing member positioned at least partially within the second passage of the body and configured to apply a downward force on the pressure member relative to the body.

6. The implantable device of claim 5, wherein:
   the body comprises a first vertical tab extending proximally from a base of the body and a second vertical tab extending proximally from the base of the body,
   the first passage is defined within the first vertical tab and offset from a center of the first vertical tab, and
   the second passage is defined within the second vertical tab and offset from a center of the second vertical tab.

7. The implantable device of claim 1, further comprising a set screw configured to apply a downward pressure on the pressure member and the head of the bone screw.

8. An implant, comprising:
   a body comprising a first arm and a second arm extending vertically from a base of the body, wherein:
      the first arm defines a first vertical tunnel within a sidewall of the first arm, and
      the second arm defines a second vertical tunnel within a sidewall of the second arm;
   a pressure cap positioned within a cavity of the body between the first arm and the second arm;
   a first spring positioned within the first vertical tunnel;
   a second spring positioned within the second vertical tunnel; and
   a first biasing member comprising a first pin attached to a first cross pin such that the first cross pin extends transverse to the first pin,
   wherein the first spring and the second spring are configured to apply a downward force on the pressure cap relative to the body, and wherein the first spring is configured to apply the downward force on the pressure cap via the first biasing member.

9. The implant of claim 8, wherein:
   the first arm comprises an external surface defining a first tool engagement feature,
   the first vertical tunnel is offset from the first tool engagement feature,
   the second arm comprises an external surface defining a second tool engagement feature, and
   the second vertical tunnel is offset from the second tool engagement feature.

10. The implant of claim 8, further comprising an expandable ring positioned within the cavity of the body and adjacent to the base of the body and the pressure cap.

11. The implant of claim 10, wherein an interior surface of the base of the body is configured to:
    restrict the expandable ring from expanding when the expandable ring is in a first vertical position relative to the body; and
    allow the expandable ring to expand to accept a head of a bone screw when the expandable ring is in a second vertical position relative to the body, the second vertical position being proximal to the first vertical position.

12. The implant of claim 8, wherein the first vertical tunnel is offset from a center of the first arm.

13. The implant of claim 8, wherein the first vertical tunnel is aligned with a center of the first arm.

14. A method for assembling an implantable device, the method comprising:
    providing a body comprising a sidewall defining:
       a passage extending within the sidewall and parallel to a vertical axis of the body; and
       a slot in communication with the passage;
    positioning a pressure cap within a cavity of the body, the pressure cap comprising a lateral surface defining a pin engagement hole;
    positioning a spring within the passage of the body;
    compressing the spring proximally within the passage;
    retaining the spring in a compressed state such that the compressed spring is disposed proximal of the pin engagement hole of the pressure cap;

inserting a first pin through the slot of the body and in the pin engagement hole of the pressure cap, wherein the first pin defines a bore extending through the first pin and transverse to a central axis of the first pin; and inserting a second pin into the passage of the body, through the bore of the first pin, and into the spring.

15. An implantable device configured to couple to a head of a bone screw, the implantable device comprising:
a body comprising a sidewall defining:
 a first passage extending within the sidewall and parallel to a vertical axis of the body; and
 a slot extending through the sidewall and in communication with the first passage;
a pressure member coupled to the body such that the sidewall at least partially surrounds the pressure member, the pressure member comprising a distal surface configured to engage the head of the bone screw and comprising a lateral surface defining an engagement feature; and
a first biasing member positioned at least partially within the first passage of the body and configured to apply a downward force on the pressure member relative to the body, the first biasing member comprising:
 a first pin positioned through the slot of the body and in the engagement feature of the pressure member; and
 a spring positioned within the first passage of the body and configured to apply, via the first pin, a downward force on the pressure member relative to the body,
wherein:
the first pin defines a pin opening extending through the first pin in a direction transverse to a longitudinal axis of the first pin,
the first biasing member further includes a second pin coupled to the first pin and extending through the pin opening, and
at least a portion of the spring is positioned around a proximal portion of the second pin.

16. The implantable device of claim 15, wherein:
the first passage comprises a distal opening, and
the second pin is configured to be received into the first passage through the distal opening.

17. The implantable device of claim 15, wherein the first pin comprises screw threads at the pin opening, and wherein the second pin comprises screw threads configured to engage the screw threads of the first pin.

18. An implantable device configured to couple to a head of a bone screw, the implantable device comprising:
a body comprising a sidewall defining:
 a first passage extending within the sidewall and parallel to a vertical axis of the body; and
 a slot extending through the sidewall and in communication with the first passage;
a pressure member coupled to the body such that the sidewall at least partially surrounds the pressure member, the pressure member comprising a distal surface configured to engage the head of the bone screw and comprising a lateral surface defining an engagement feature; and
a first biasing member positioned at least partially within the first passage of the body and configured to apply a downward force on the pressure member relative to the body, the first biasing member comprising:
 a first pin positioned through the slot of the body and in the engagement feature of the pressure member; and
 a coil spring positioned within the first passage of the body and configured to apply, via the first pin, a downward force on the pressure member relative to the body.

19. An implant, comprising:
a body comprising a first arm and a second arm extending vertically from a base of the body, wherein:
 the first arm defines a first vertical tunnel within a sidewall of the first arm, and
 the second arm defines a second vertical tunnel within a sidewall of the second arm;
a pressure cap positioned within a cavity of the body between the first arm and the second arm;
a first spring positioned within the first vertical tunnel;
a second spring positioned within the second vertical tunnel; and
a first biasing member comprising a first pin attached to a first cross pin such that the first cross pin extends transverse to the first pin,
wherein:
the first spring and the second spring are configured to apply a downward force on the pressure cap relative to the body,
the pressure cap comprises a lateral surface defining a first pin engagement feature,
a first end of the first cross pin engages the first pin engagement feature,
a proximal end of the first pin is positioned within the first vertical tunnel, and
the first spring is configured to apply the downward force on the pressure cap via the first biasing member.

20. The implant of claim 19, further comprising a second biasing member comprising a second pin attached to a second cross pin such that the second cross pin extends transverse to the second pin,
wherein:
 the lateral surface of the pressure cap further defines a second pin engagement feature,
 a first end of the second cross pin engages the second pin engagement feature,
 a proximal end of the second pin is positioned within the second vertical tunnel, and
 the second spring is configured to apply the downward force on the pressure cap via the second biasing member.

* * * * *